P. F. MOREY.
Air-Valve Attachment for Sewers, &c.
No. 209,975.  Patented Nov. 19, 1878.
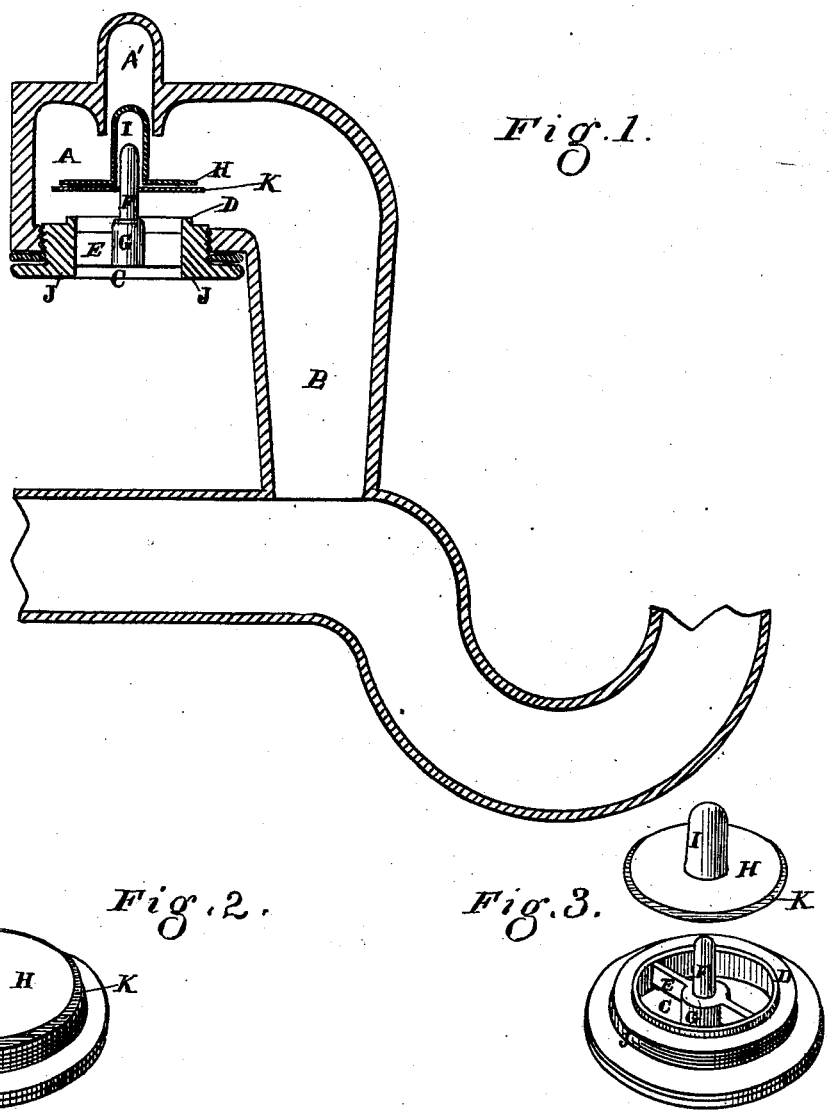

UNITED STATES PATENT OFFICE.

PARKER F. MOREY, OF SAN FRANCISCO, CALIFORNIA.

IMPROVEMENT IN AIR-VALVE ATTACHMENTS FOR SEWERS, &c.

Specification forming part of Letters Patent No. 209,975, dated November 19, 1878; application filed April 29, 1878.

*To all whom it may concern:*

Be it known that I, PARKER F. MOREY, of the city and county of San Francisco, and State of California, have invented Improvements in Air-Valve Attachments for Sewer, Stench, and Water Traps; and I do hereby declare the following to be a full, clear, and exact description thereof, reference being had to the accompanying drawings.

My invention relates to a novel construction of an attachment, such as are intended by their shape to retain in them a body of liquid, which acts as a valve or stop, to prevent the return through the connecting pipe or passage of noxious or other vapors.

Such traps are most general and important for use in connection with sinks, drains, water-closets, wash-basins, bath-tubs, and similar places from which it is necessary to frequently allow the escape of the contents directly into a sewer or cess-pool, and where it is of the greatest importance to prevent the return of any foul or noxious gases or vapors.

The most common construction for these traps is to employ a pipe of suitable size, bent into a form similar to a letter S or P turned upon one side, so that the curve nearest the basin or receptacle shall retain sufficient water in it to prevent the return of any vapors or gas. Practically this is rarely done, because the body of water running out through the long discharge-pipe causes the water to siphon out of the trap or curve, and thus allow a free passage for any gases or vapors from below. Efforts have been made to overcome this evil by the construction of various devices, including ball or hinged valves, which should admit air to the upper part of the trap, but prevent the escape of vapor. Most of these devices fail, either because the valve is not tight or because it must be made so heavy, to prevent its being burst by sudden pressure, that it fails to act.

I have succeeded in constructing a valve so light that it will be sensitive to the slightest pressure of external air, but will be at all times tight against internal pressure, while it is at the same time so supported as to resist any pressure that may be brought upon it without being burst open or damaged.

In the accompanying drawings, Figure 1 is a vertical section of our valve-chamber, showing its attachment to a trap and the valve. Fig. 2 is a view of the valve. Fig. 3 is a view of the valve-seat.

A is the chamber within which the valve is contained. This chamber stands above the upper curve of the trap, and has a pipe, B, connecting with it. The lower part of this chamber has an opening, C, and the valve-seat D is formed where this opening connects with the chamber. This seat is formed by a light raised rim, as shown, so that the valve shall have a narrow but perfect bearing. Across the center of this opening C a bar, E, extends, and the stem F rises from the center of this bar so as to serve as a guide for the valve, and an enlarged hub or bearing, G, is formed about on a level with the seat D. This central bearing serves to support the center of the valve under the strain of any great pressure, so that it will not be crushed or bent so as to be caused to leak. This is necessary on account of the extreme lightness with which the valve must be made so that it will act.

The valve H is made of metal. I have preferred to make it by spinning or otherwise forming it with a hollow socket, I, closed at the top and fitting over the guide-stem F, as shown. This insures a direct movement without any danger or displacement, as the socket I would strike the top of the chamber before it could be lifted off the stem F. Between the valve and the seat I have shown a rubber or light elastic disk, K, which serves to form a tight joint. For convenience the valve-seat may be formed upon a plate or cap, J, which screws into the bottom of the chamber, so that the valve and seat may be removed bodily by simply unscrewing this cap.

The action of this device is light and instantaneous. Any external pressure of air caused by a tendency to siphon will open the valve and admit the air and prevent the escape of water from the trap. The interior pressure from the gas is sustained by the valve, and it may be shown that there is usually a considerable pressure upon the valve when it is not in action, so that the space in the chamber is an air-space, and no water will ever be allowed to enter it.

The chamber A may be made preferably with a hollow projection, A', above and in a line with the center of the valve-opening C. This allows the socket I of the valve to rise into this projection in the case, and thus allows more play to the valve without making the chamber in any way clumsy. It also serves as an exterior guide for the valve when the latter has risen so that the stem F does not steady it, and I am thus enabled to employ a comparatively short guide-stem. By this construction of the chamber I am enabled to chuck it in a lathe for boring and finishing with comparatively little expense or trouble.

Having thus described my invention, what I claim as new, and desire to secure by Letters Patent, is—

1. The valve-chamber A, having the pipe B connecting it with the upper curve of the trap, and provided with the valve-opening C, having the seat D and the central guide F with its supporting central bearing, substantially as shown, and for the purpose herein described.

2. The valve-chamber A, with its hollow extension A', and the valve-opening C, having the seat D and central guide F with a supporting central bearing, substantially as shown, and for the purpose herein described.

3. In combination with the chamber having the extension A', the seat D G, and the guide-stem F, the valve H, with its socket I, and the elastic disk K, substantially as shown, and for the purpose herein described.

In witness whereof I hereunto set my hand and seal.

PARKER FARNSWORTH MOREY. [L. S.]

Witnesses:
FRANK A. BROOKS,
M. A. NEAL.